UNITED STATES PATENT OFFICE.

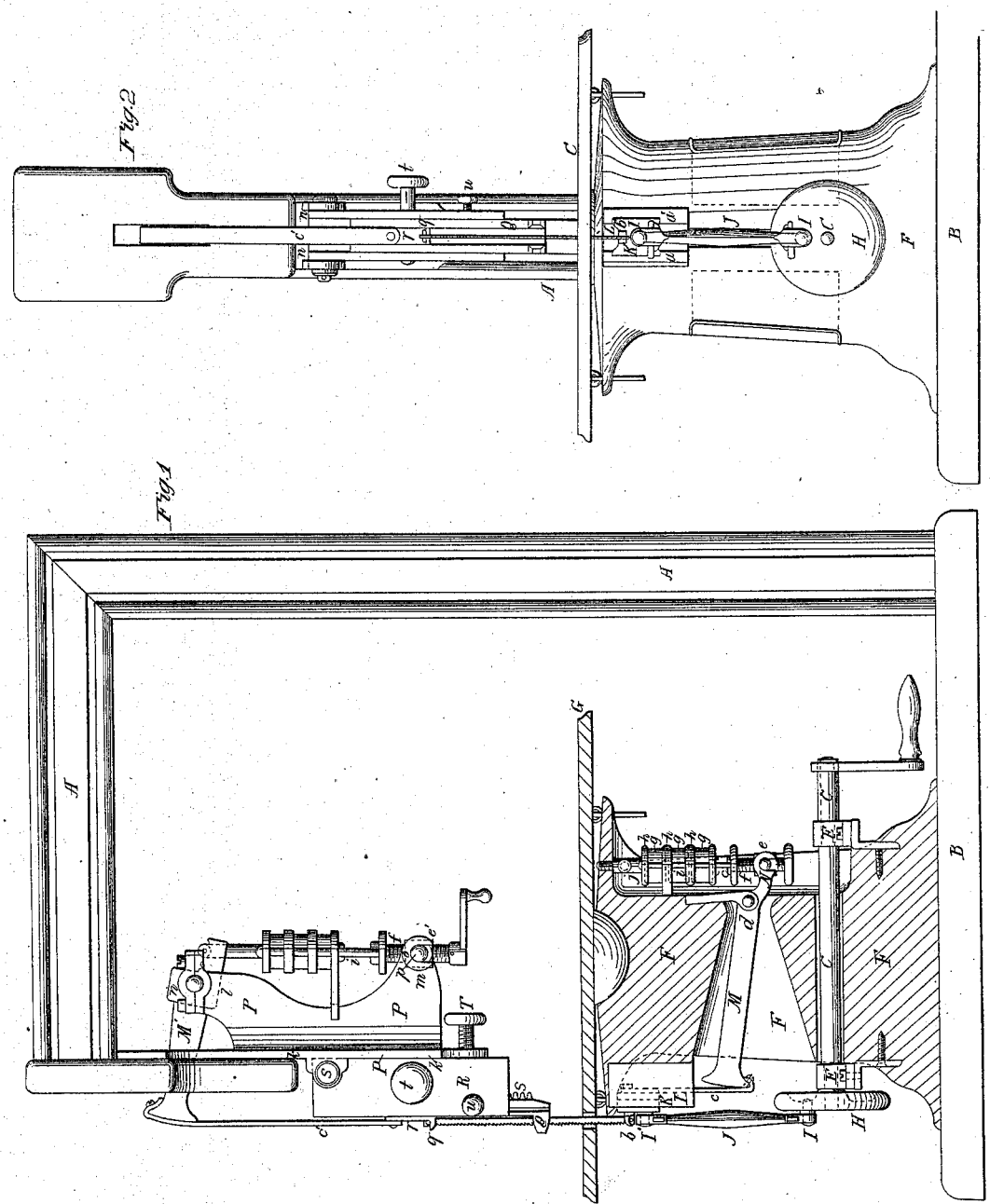

H. D. STOVER AND EDWARD S. WRIGHT, OF NEW YORK, N. Y., ASSIGNORS TO HENRY D. STOVER.

IMPROVEMENT IN SCROLL-SAWING MACHINES.

Specification forming part of Letters Patent No. 35,492, dated June 3, 1862.

*To all whom it may concern:*

Be it known that we, HENRY D. STOVER and EDWARD S. WRIGHT, both of the city, county, and State of New York, have invented certain new and useful Improvements in Sawing Machinery; and we hereby declare the following to be a full, clear, and exact description of the same, reference being had to the accompanying drawings, in which—

Figures 1 and 2 represent, respectively, a side and front elevation of our improvements applied to a double-acting scroll or jig saw.

The leading essential features of this our invention relate to the so arranging sawing machinery that an effective amount of tension may be given to the saw without interfering with the machine being driven at high velocity, and of the "rake" or "overhang" of the saw being easily and accurately adjusted to suit the amount of feed given to the wood; and our invention consists, first, in the method of hanging the saw by means of straps to the forward and segmental ends of two walking-beams or levers, the rear end of each of which is restrained by a spring applied and operating substantially in the manner hereinafter set forth; second, in the method of permanently maintaining the requisite tension throughout the whole stroke of the saw by means of a spring applied to each end of the saw, the two springs being so constructed, arranged, and operating as to compensate each other, substantially in the manner hereinafter described; third, in the method of regulating the amount of tension to the saw by combining with each tension-producing spring a screw or its equivalent so operating upon the said spring as to increase or decrease its elasticity, both the springs and screws being arranged in relation to each other and in relation to the moving parts of the machinery so that the regulating of the tension may be effected while the saw is in motion; fourth, in the combination, with the slide-piece or buckle, of a guide-block constructed and arranged, as hereinafter described, to admit of adjustment within an adjustable guide-bed in accordance with the length and rake of the saw; fifth, in the combination, with the slide-piece and suitable guides, of a set-screw or other equivalent mechanism arranged in some stationary part of the frame, so as to allow of the adjustment of the rake of the saw during its operation; sixth, in the employment of a vulcanized india-rubber spring, the constitutive parts whereof are constructed, arranged, and combined, as hereinafter described, so that the spring shall operate by virtue of compressibility in contradistinction of the tensibility of india-rubber.

The ordinary method of balancing saw-frames by the use of counterbalance-weights is very objectionable, and has been generally abandoned on account of the dead-weight of the material performing a reciprocating action at the rate of many hundred feet per minute, requiring exceedingly heavy working-frame to withstand jerks to which it is subjected, and besides which, much friction being created, moreover, according to the old method, each individual saw being necessarily provided with its own tension apparatus, generally consisting of a nut outside of the frame on the threaded end of the saw-blade, its use involved the necessity of frequently stopping the whole frame to adjust the tension of any one saw.

To reduce the weight of the machine, and particularly to enable the construction of light portable sawing apparatus carrying but one or two saws, tension is now being given to the saws by a method dispensing with the ordinary heavy saw-frame, and consisting in hanging the saw or saws in such a manner as to be actuated by springs. These springs have heretofore been made of wood, iron, steel, or of some other material flexible in its nature, and were applied overhead. In some instances atmospheric springs were used, but they had a very limited application, as they are impracticable, liable to get out of order, and require costly apparatus. The former—viz., the flexible spring—is irregular in its action upon the saw-blade, and when operating at high speed the sudden transition from slack to extreme tension of the saw causes the blade to snap.

Our invention is designed to remedy these inconveniences and defects, and we have succeeded in effecting our object by the contrivance of an apparatus of which the following is a description.

The main frame A of the machine consists of a base or foundation plate, B, carrying a strong wooden or iron post or column, from the upper end of which projects toward the front of the machine a bracket, to which is attached the greater part of the mechanism for the suspension of the saw and for regulating its tension.

The sawing mechanism is driven or actuated by the main horizontal shaft C, carrying a crank, D, or preferably fast and loose band-pulleys receiving motion from some prime mover. This shaft is here shown concealed within and passing centrally through the pedestal or support F of the table or platform G, and revolves in bearings E, fast in said pedestal. The front end of this shaft is provided with a disk, H, carrying a crank-pin, I, upon which is keyed the lower end of the connecting-rod J. The upper end of this connecting-rod is keyed to a pin, I', fast in a sliding block, K, the sides of which are grooved, so as to be guided by and upon ways $a$ and $a'$, constituting the borders of an open case, L, sunk within and fast to the pedestal. The sliding block K is provided with a slotted hook, $b$, slightly curved downward, forming a recess in which, by means of a cross-pin, the extremity of the saw-blade is fastened. The pedestal is provided with an opening wider in front than in the rear to allow of a vibrating up-and-down motion of the lever or beam M on the pivot $d$ as center of vibration. The short end N of this lever is forked, its branches embracing a threaded nut, $e$, armed on its sides with projecting studs, whereby it is held up against the recesses in the branches of the lever end. Through the nut passes a threaded spindle, $f$, which connects the lever or beam M with the tension apparatus O. The latter consists of a series of centrally-perforated india-rubber disks, $g$, with which are arranged in alternate order a series of metal disks, $h$. The latter are oblong in form, and, besides the central perforations corresponding with those of the rubber disk, they have eyes diametrically opposite and outside of the circle described by the rubber disks, through which the tension-rods $i$ pass. The central holes of the alternating rubber and metal disks are traversed by a spindle, $j$, the upper end of which is screwed or bolted or otherwise securely fixed in the pedestal, while its lower end is headed, thus vertically holding in suspension the several disks. The tension-rods above referred to by means of their heads clasp together the metal disks only, the uppermost of which is immediately above the first rubber disk, while the lowermost is engaged by the head of the screw-threaded spindle $f$. From this arrangement it will be readily perceived that the rubber disks are being more or less compressed, according to the spindle $f$ exerting more or less tensional strain on the tension-bars $i$, and consequently there will be more or less tendency to actuate the short lever upward. It will also be understood that the rubber disks are more or less compressed, according to the position of the beam or lever, since the lowermost metal disk is held stationary by the central spindle, $j$, and the tension-bars acting upon the uppermost disk impart by the movements of the lever or beam an up-and-down movement to the said upper disk, and thereby create a compression more or less intense, according to the position of the lever, that in its turn receives motion from the sliding block, with which it is connected by means of the strap $c$.

The apparatus just now described acts permanently on the sliding block, the springs being always more or less compressed; hence they will always bear up against the short end of the lever, and consequently depress the forward or long end of the lever, which, imparting its downward tendency to the sliding block, will give to the saw, supposing it to be attached at its upper end, a variable tension according to the position of the lever, and a general tension according to the compressed state of the springs.

Another tension apparatus similar in construction and operation is applied to the end of the saw overhead. A metallic casing, P, fitted to the bracket of the main frame, contains all the parts necessary to give the saw the requisite tension to properly guide it in its required alternate longitudinal traverse and to adjust in accordance with the feed, &c., the necessary overhang or rake. The casing P is composed of a plate, $k$, bolted to a block descending from the forward end and after bracket. To the plate $k$ are cast or otherwise united a branched bracket, $l$, carrying suitable journals, $n$, in which the axle of the upper lever or beam, M', rests, and a forked support, $m$, into the recesses $o$ of which the axle $p$ of a nut, $e'$, is held. This upper tension apparatus is held in the same manner as the lower tension device, by the lever applied to the one end and by the screw-threaded spindle $f$ on the other. The difference between the two is simply one of position, whereby the upper tension device is reversed in its operation—that is to say, the movable disk that is actuated directly by the lever being lowermost, while the disk that is stationary is uppermost, the compression of the rubber disks in the overhead tension apparatus will be greatest when it is least in the tension apparatus under the table or platform. The two tension devices therefore compensate each other, and the saws are kept up uniformly to the required tensional strain and to their necessary steady working condition. From the above it will also be seen that the tension apparatus being applied to a stationary part of the machine, the tension of the saw may be regulated by turning the handle or crank of the screw-threaded spindle without stopping the operation of the saw.

The upper end of the saw is buckled to or hung in the slotted hook $q$, connected with the lever or beam M' by means of a strap, $c'$. This hook is part of a slide-piece, $r$, which is fitted to traverse vertically between two inner faces of the adjustable guide-block Q. The latter is capable of adjustment within a sleeve, R, by means of the rack $s$, pinion $t$, and set-screw $u$.

The rack and pinion are concealed within the sleeve. The pinion is or may be operated by a crank or wheel on the outside of said sleeve. After the guide-block is set in its proper position by means of the pinion it is fixed by turning the set-screw $u$ to impinge upon its side.

The adjustability of the guide-block is important in view of the different sized saws and length of stroke, also as affecting the amount of rake to be given to the saw. The rake or overhang of the saw is regulated in the following manner: The sleeve R, carrying both the guiding-block and slide-piece, is hung or pivoted by the rear and upper corner at $s$ to the ears cast to and projecting from the face-plate $k$. A large set-screw, T, in the tail-piece of the plate $k$ bearing on the lower end and rear of the sleeve will, on being turned, push the sleeve forward and keep it in any given position according to the screw being more or less advanced. By this means the rake may be very nicely adjusted and regulated whether the saw is at rest or running.

Having thus fully described our invention and the manner in which the same is or may be carried into effect, we shall state our claims as follows:

1. The method of hanging the saw by means of straps to the forward and segmental ends of two walking beams or levers, the rear end of each of which is restrained by a spring, arranged and operating substantially in the manner herein set forth.

2. The method of permanently maintaining the requisite tension throughout the whole stroke of the saw by means of a spring applied to each end of the saw, the two springs being constructed, arranged, and operating, as described, to compensate each other, substantially in the manner herein set forth.

3. The method of regulating the amount of tension to the saw by combining with each of the tension-producing springs a screw or its equivalent so operating upon the said spring as to increase or decrease its elasticity, both the springs and screws being arranged in relation to each other and in relation to the moving parts of the machinery so that the regulating of the tension may be effected while the saw is in motion, substantially in the manner herein described.

4. In combination with the slide-piece or buckle, a guide-block constructed and arranged, as herein described, to admit of adjustment within an adjustable guide-bed in accordance with the length and rake of the saw.

5. The employment of vulcanized india-rubber springs the constituent parts whereof are constructed, arranged, and combined, as herein described, so that the springs shall operate by virtue of compressibility in contradistinction of the tensibility of india-rubber.

In testimony whereof we have signed our names to this specification before two subscribing witnesses.

H. D. STOVER.
EDWARD S. WRIGHT.

Witnesses:
AINSWORTH BROWN,
ALBERT R. BASS.